(12) United States Patent
Bumgarner et al.

(10) Patent No.: US 10,202,085 B2
(45) Date of Patent: Feb. 12, 2019

(54) FASTENER

(71) Applicant: APLIX, INC., Charlotte, NC (US)

(72) Inventors: John Bumgarner, Maiden, NC (US); Marc Woodling, Charlotte, NC (US); Scott Jhun, Troy, MI (US)

(73) Assignee: APLIX, Le Cellier (FR)

( * ) Notice: Subject to any disclaimer, the term of this patent is extended or adjusted under 35 U.S.C. 154(b) by 0 days.

(21) Appl. No.: 15/246,563

(22) Filed: Aug. 25, 2016

(65) Prior Publication Data

US 2018/0056893 A1  Mar. 1, 2018

(51) Int. Cl.
| | | |
|---|---|---|
| *B60R 13/02* | (2006.01) | |
| *F16B 2/22* | (2006.01) | |
| *F16B 1/00* | (2006.01) | |
| *F16B 5/06* | (2006.01) | |
| *F16B 21/08* | (2006.01) | |

(52) U.S. Cl.
CPC ............ *B60R 13/0212* (2013.01); *F16B 1/00* (2013.01); *F16B 2/22* (2013.01); *F16B 5/065* (2013.01); *F16B 21/086* (2013.01); *F16B 2001/0028* (2013.01)

(58) Field of Classification Search
CPC ........... B60R 13/0212; F16B 1/00; F16B 2/22
See application file for complete search history.

(56) References Cited

U.S. PATENT DOCUMENTS

| | | | | |
|---|---|---|---|---|
| 2,836,215 A | * | 5/1958 | Rapata | .................... F16B 12/30 |
| | | | | 174/158 R |
| 3,851,357 A | * | 12/1974 | Ribich | ............... A44B 17/0035 |
| | | | | 24/306 |
| 3,916,703 A | | 11/1975 | Ribich et al. | |
| D269,589 S | * | 7/1983 | Nakama | ........................ D8/356 |
| 5,012,995 A | * | 5/1991 | Ward | ....................... H02G 3/26 |
| | | | | 248/68.1 |
| 5,058,245 A | | 10/1991 | Saito et al. | |
| 5,242,646 A | * | 9/1993 | Torigoe | ................... B29C 33/52 |
| | | | | 249/61 |
| D360,574 S | * | 7/1995 | Oda | ............................... D8/382 |
| D392,877 S | * | 3/1998 | Eguchi | .......................... D8/382 |
| D396,406 S | * | 7/1998 | Eguchi | .......................... D8/382 |
| 7,018,496 B1 | | 3/2006 | George et al. | |
| 7,337,505 B1 | | 3/2008 | Scroggie et al. | |
| 7,594,629 B2 | * | 9/2009 | Smutny | .................... H02G 3/30 |
| | | | | 248/71 |
| 2015/0158437 A1 | | 6/2015 | Tuma | |
| 2015/0298623 A1 | | 10/2015 | Kato et al. | |
| 2016/0073742 A1 | | 3/2016 | Ito et al. | |

OTHER PUBLICATIONS

International Search Report dated Nov. 15, 2017, in International Application No. PCT/EP2017/071302 (2 pages).

* cited by examiner

*Primary Examiner* — Robert Sandy
*Assistant Examiner* — David M Upchurch
(74) *Attorney, Agent, or Firm* — Bookoff McAndrews, PLLC

(57) ABSTRACT

A fastening element includes a gripping portion having a gripping face and a back face opposite the gripping face, an anchoring portion comprising an anchor proximal end affixed to the gripping portion and an anchor distal end, the anchoring portion comprising at least one resilient clip configured to anchor the fastening element in a substrate with a retention force greater than an insertion force necessary for inserting the anchoring portion into a mounted position on a substrate.

15 Claims, 4 Drawing Sheets

FASTENER

FIELD OF THE DISCLOSURE

The disclosure relates to a reduced insertion force fastener, and more particularly, to a reduced insertion force fastener having an anchoring portion configured to be used with a variety of substrates, where the substrates may have different thicknesses.

BACKGROUND OF THE DISCLOSURE

In certain industries fasteners play a critical role in the assembly of various products, and it is generally desirable to enable such fasteners to be easily inserted in order to facilitate the job of an installer while reducing repetitive process type injuries. However, it is also important that such fasteners hold tightly under varying stresses and loads, while also remaining free from generation of sound due to vibration, among others.

For example, in the automotive industry many pieces of a vehicle are fastened to other pieces of the vehicle, e.g. headliners to a roof of the vehicle, and it is important that these fasteners have high closure strength, while remaining silent. It is also desirable that these fasteners are easy to install to reduce the risk of injury to an installer who may install tens or even hundreds of the fasteners per day.

In addition, numerous configurations exist at installation time, for example, in an automotive application. A single fastener design is often insufficient to meet the various installation configurations, for example, based on a thickness of a substrate to which the fastener is to be installed. Therefore, numerous fastener configurations are generally made available during installation. This means that a manufacturer must be able to provide a number of custom fastener configurations for various applications, which can lead to added cost and manufacturing issues.

US 2015/0158437 discloses a fastening system having at least one holding part which can be fitted to a component and which, on one side, has a flat carrier part, which is provided with adhering or hooking elements projecting on one side and, on the opposite side, has at least one fastener. A sealing device is also provided.

SUMMARY OF THE DISCLOSURE

The inventors of the present application have determined that a reduced installation force fastener with high holding strength, and adaptability to various substrate thicknesses would be beneficial.

Therefore, in accordance with the disclosure, a fastening element is provided. The fastening element includes a gripping portion having a gripping face and a back face opposite the gripping face, and an anchoring portion comprising an anchor proximal end affixed to the gripping portion and an anchor distal end, the anchoring portion including at least one resilient clip configured to anchor the fastening element in a substrate with a retention force greater than an insertion force necessary for inserting the anchoring portion into a mounted position on a substrate. The at least one resilient clip includes a clip proximal end located in proximity to the anchor distal end and a clip distal end located in proximity to the anchor proximal end, a compression portion extending from the clip proximal end and configured to cause a deflection of the at least one clip toward a longitudinal axis of the anchoring portion during insertion of the anchoring portion into a receiver of the substrate, a shoulder extending from a terminus of the compression portion toward the longitudinal axis of the anchoring portion, a retaining portion configured to exert a retaining force on the substrate based on the resilient action of the at least one clip, the retaining portion extending at a non-orthogonal angle from a position near the shoulder toward the clip distal end as measured relative to a radial axis of the anchoring portion.

By providing such a fastener, a relatively low insertion force fastener may be obtained, while relatively high retention force may result. In addition, a fastener having such a configuration may enable installation in a wide range of substrate thicknesses. The wide range of substrate thicknesses comprises a maximum thickness and a minimum thickness. The maximum thickness may be at least 105% of the minimum thickness, in particular, the maximum thickness may be at least 150% of the minimum thickness, in such case, the maximum thickness may be at least 200% of the minimum thickness. The range of substrate thicknesses may be comprised between in particular 0.1 mm and 2 mm, in particular between 0.7 mm and 1.6 mm or between 0.5 mm and 1.2 mm or between 0.1 mm and 1.5 mm.

In an at-rest position of the resilient clip, the shoulder may extend substantially perpendicularly to the longitudinal axis of the anchoring portion.

A shoulder buffer portion extending substantially perpendicularly from the shoulder toward the clip distal end may be provided.

The non-orthogonal angle may range between 10 and 80 degrees as measured relative to a radial axis of the anchoring portion, in particular between 10 and 50 degrees as measured relative to a radial axis of the anchoring portion.

The insertion force may range between about 25 and 45 N and the retention force may be higher than 133N, in particular the retention force may range between about 133N and 250 N.

The gripping face may include at least one of a plurality of hooks and/or a plurality of loops.

The gripping face may include a plurality of hooks integrally molded with the fastening element.

A length of the at least one resilient clip may range between 3.5 and 5.5 mm as measured from a tip of the clip distal end to a base of the clip proximal end, in particular, between 4.5 mm and 5.5 mm.

The anchoring portion may be integrally molded with the gripping portion.

The anchoring portion may be fastened to the back face.

The fastening may be performed by at least one of gluing and overmolding of the plurality of hooks and/or the plurality of loops.

A clearance between the clip distal end and the back face may range between 0.5 and 2 mm, in particular, between 1 mm and 2 mm.

A width of the at least one clip may range between 0.9 and 2.6 mm.

The fastening element and anchoring portion may be molded of a thermoplastic material.

The shoulder may have a width similar to the width of the one clip, in particular a width ranging from 0.4 to 1.5 mm.

According to further embodiments of the present disclosure, a multi-substrate anchor for a fastening element is provided. The multi-substrate anchor includes an anchor proximal end and an anchor distal end, the anchoring portion comprising at least one resilient clip configured to anchor the fastening element in any one of a plurality of substrates each of the substrates having a thickness that is different from the other substrates. The at least one resilient clip includes a clip proximal end located in proximity to the anchor distal end and a clip distal end located in proximity to the anchor proximal end, a compression portion extending from the clip proximal end and configured to cause a deflection of the at least one clip toward a longitudinal axis of the multi-substrate anchor during insertion of the multi-substrate anchor into a through-hole in the substrate, a shoulder extending from a terminus of the compression portion toward the longitudinal axis of the anchoring portion, and a substrate interface extending from a point near the shoulder and configured to exert a retaining force on at least a portion of the thickness within the through-hole in the substrate based on the resilient action of the at least one clip, the retaining portion extending toward the clip distal end at an acute angle relative to the longitudinal axis of the multi-substrate anchor.

By providing such an anchor, a fastener having a relatively low insertion force may be obtained, while relatively high retention force may result. In addition, a fastener having such a configuration may enable installation in a wide range of substrate thicknesses.

In an at-rest position of the resilient clip, the shoulder may extend perpendicularly to the longitudinal axis of the multi-substrate anchor.

The multi-substrate anchor may further include a shoulder buffer portion extending perpendicularly from the shoulder toward the clip distal end.

The clip may be configured such that the shoulder does not bear on the substrate when the anchor is in an installed position unless an extraction force is applied to the anchor.

According to still further embodiments of the present disclosure, a fastening element is provided. The fastening element includes a gripping portion having a gripping face and a back face opposite the gripping face, and an anchoring portion comprising an anchor proximal end affixed to the gripping portion and an anchor distal end, the anchoring portion comprising at least one resilient clip configured to anchor the fastening element in a substrate with a retention force greater than an insertion force necessary for inserting the anchoring portion into a mounted position on a substrate. The at least one resilient clip includes a clip proximal end located in proximity to the anchor proximal end and a clip distal end, a compression portion extending at an angle from the clip distal end and configured to cause a deflection of the at least one clip toward a longitudinal axis of the anchoring portion during insertion of the anchoring portion into a receiver of the substrate, a shoulder extending from a terminus of the compression portion toward the longitudinal axis of the anchoring portion, and a retaining portion configured to exert a retaining force on the substrate based on the resilient action of the at least one clip, the retaining portion extending at a non-orthogonal angle from a position near the shoulder toward the clip proximal end as measured relative to a radial axis of the anchoring portion.

One of skill in the art will understand that various combinations of the above elements may be made except where clearly contradictory.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1A:
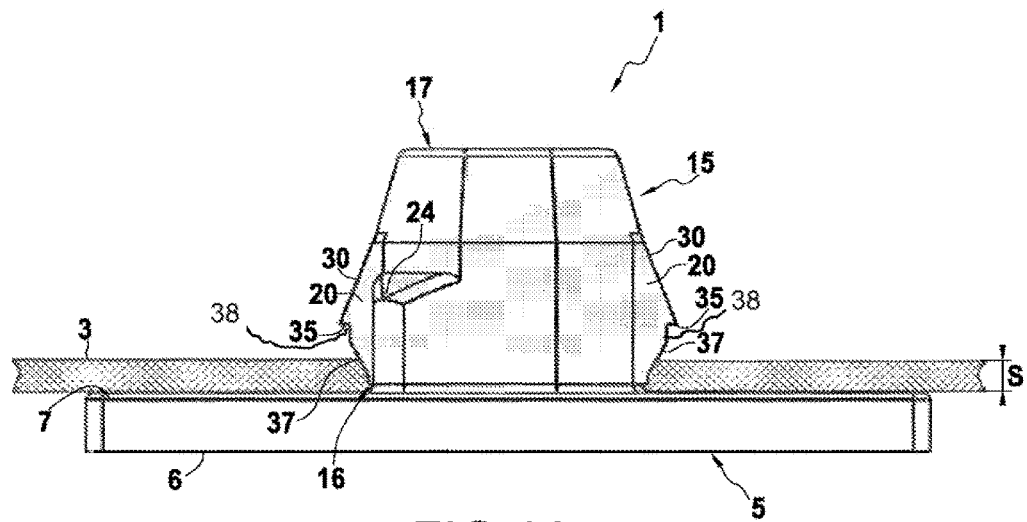
FIG. 1A is an exemplary side view representation of a fastening element according to embodiments of the present disclosure installed in a substrate of a first thickness, the substrate is a view in cross section which the cut line passing through the middle of the fastening element and the two resilient clips.
Figure 1B:
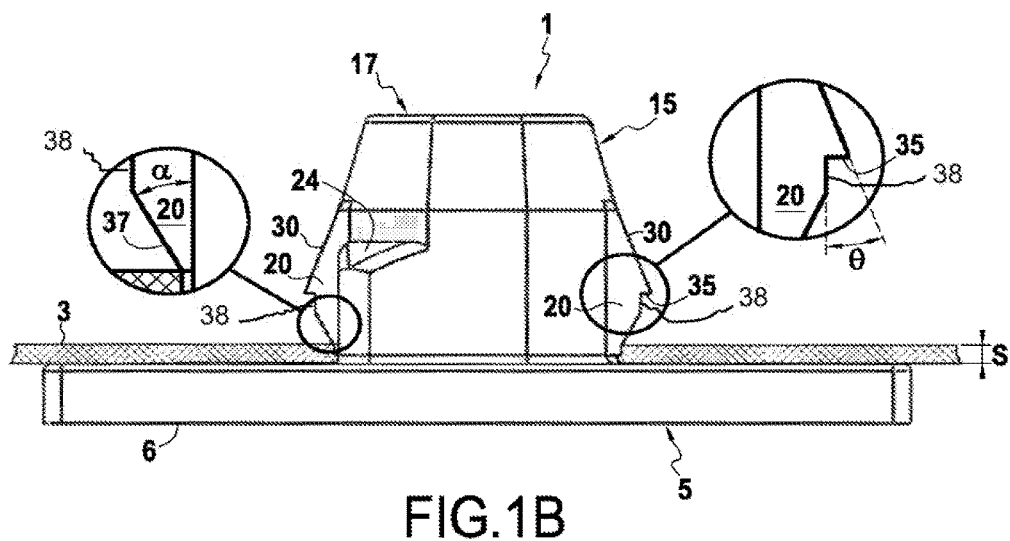
FIG. 1B is an exemplary side view representation of a fastening element according to embodiments of the present disclosure installed in a substrate of a second thickness, the substrate is a view in cross section which the cut line passing through the middle of the fastening element and the two resilient clips.

FIGS. 1A and 1B are exemplary side view representations of a fastening element 1 installed in a substrate 3, the substrate is a view in cross section which the cut line passing through the middle of the fastening element and two resilient clips, according embodiments of the present disclosure. Substrates 3 of FIGS. 1A and 1B have different thicknesses S. The thickness S of the substrate 3 of FIG. 1A is greater than the thickness S of the substrate 3 of FIG. 1B. However, the thicknesses illustrated are not intended as to scale nor to be interpreted as the maximum thickness and the minimum thickness of the substrate for which the fastening element according to the invention may be mounted into. Those FIGS. 1A and 1B are exemplary only Fastening element 1 may be configured for insertion into substrate 3 such that fastening element 1 has a retention force greater than an insertion force necessary for inserting an anchoring portion 15 of the fastening element into a mounted position on substrate 3. When discussing an insertion force, it is intended that such a force be measured by for example, a push/pull gauge (e.g., an IMADA push pull scale) used for applying force to fastening element 1 during insertion. When discussing retention force, it is intended that such a force be measured by a similar method, for example, using the pull portion of the push/pull gauge.

Fastening element 1 may be molded, e.g., injection molded, over-molded, etc. using various materials, for example, thermoplastic, composite, and/or other suitable materials. Thermoplastic materials may include polypropylenes or polyurethanes according to embodiments of the present disclosure. For example, for a polypropylene, a mixture of unsaturated polyester constituted by 50% homopolymer and 50% copolymer can be chosen, having a fluidity index in molten state of 22 g/10 mn and a flexion module of 130,000 to 150,000 psi. Other possible materials include a polypropylene of Atofina, PPC 5660, having a fluidity index in molten state of 7 and a flexion module of 175,000 psi, propylene copolymers of BP Amoco (Acclear 8949 and Acctuf impact copolymer 3934X) having fluidity index values in molten state of 35 to 100, and flexion modules of 190,000 to 250,000 psi; polystyrenes, acrylonitrile butadiene styrenes, high density polyethylene, low density linear polyethylene, polycarbonate. The indexes in molten state are between 1 and 100 and the flexion modules are between 30,000 and 1,140,000, preferably between 100,000 and 1,000,000, more preferably between 300,000 and 1,000,000.

Resins other than propylene-based resins which may be suitable include impact polystyrene, acrylonitrile butadiene styrene, nylon, high density polyethylene, low density linear polyethylene, polycarbonate and olefinic thermoplastic resins. Polypropylenes can also be provided which are reinforced by long glass fibers, having a very high flexion module (resin 30YM240/10010 having a flexion module of 856,000 psi and resin 40YM240/10010 having a flexion module of 1,140,000 psi, sold by StaMax). In this case, the long glass fibers do not migrate into the cavities (which are too small or too thin for the long fibers to penetrate therein), and a very rigid plate is obtained with flexible hooks.

According to some embodiments, fastening element 1 is injection molded using a single-step process such that the resulting device is of unitary construction, i.e., all elements of fastening element 1 are integrally formed. Such formation may yield desirable strength and ease of fabrication, as well as eliminating subsequent assembly of layered portions (e.g., a gripping portion layer) to a base layer.

The device may comprise a visible injection gate. Alternatively, portions of fastening element 1 may be injection molded using a single step process, and for example, gripping elements and/or anchoring portion 15 may be joined to fastening element 1 by adhesive, or other suitable bonding (e.g. melting and re-solidification, over-molding, etc.).

Fastening element 1 includes a gripping portion 5 having a gripping face 6 and a back face 7 opposite the gripping face 6. Fastening element 1 further includes an anchoring portion 15 comprising an anchor proximal end 16 affixed to the gripping portion 5 (e.g., at a geometric center of back face 7) and an anchor distal end 17.

Gripping portion 5 may be provided with a plurality of gripping elements 21 and/or 22 extending from gripping portion 5 (e.g., from gripping face 6) at a height H1. For example, a gripping face 6 may include a plurality of hooks integrally molded and/or over-molded with fastening element 1.

According to some embodiments, gripping elements 21 and/or 22 may extend in rows perpendicularly away from gripping portion 5 such that distal portions of gripping elements 21 and/or 22 are spaced at a predetermined distance from gripping face 6 and back face 7. Importantly, one of skill will understand that gripping elements 21 and/or 22 may extend in any direction desirable for achieving a desired fastening, and the entire plurality of gripping elements 21 and/or 22 need not extend in the same direction but the entire plurality of gripping elements may be extended in the same direction. Further, height H1 may vary among gripping elements 21 and/or 22, or may be substantially uniform. The height H1 of the gripping element comprising hooks may be between 0.1 mm and 2 mm, in particular between 0.2 mm and 1.7 mm or between 0.9 mm and 1.43 mm.

Gripping elements 21 and/or 22 may comprise hooks and/or loops whose characteristics enable gripping elements 21 and/or 22 to achieve fastening with another desired surface, for example, a surface comprising a plurality of loops or hooks designed to interact with gripping elements 20 and/or 20' to effect such a fastening. Gripping elements 21 and/or 22 may be arranged in rows and columns. According to some embodiments gripping elements 21 and/or 22 may be arranged with an alternating orientation of their heads within a row, and over substantially the entire gripping face 6, as shown at, for example FIG. 4 so as to facilitate the fastening with the second surface. Alternatively, gripping elements 21 and/or 22 may be arranged with a single orientation over the entire surface of gripping face 6.

As used herein the term "head" relating to a gripping element 21 and/or 22 refers to a distal portion of gripping element 21 and/or 22 where the active portion of the hook is located (i.e., the curved hooking surface).

Gripping elements 21 and/or 22 may cover a substantial area associated with gripping face 6. For example, coverage of at least 50, 60, 70, 80 and even 90 percent of gripping surface area may be effected by gripping elements 21 and/or 22. One skilled in the art will recognize that any desirable coverage amount for gripping elements 21 and/or 22 may be implemented without departing from the scope of the present disclosure. The coverage of at least 80, 85, 90, 95 percent of the gripping surface area may be effected by gripping elements 21 and/or 22 in order to maximize the gripping function.

Figure 4:
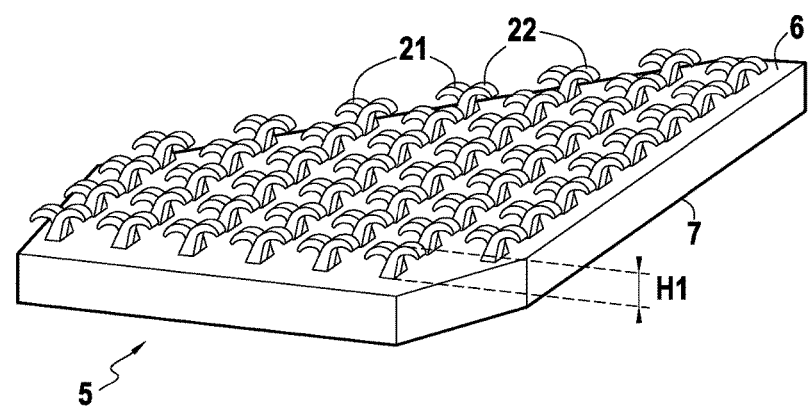
FIG. 4 is an exemplary representation of gripping elements on a gripping face of a fastening element according to embodiments of the present disclosure.

When gripping elements 21 and/or 22 are implemented as hooks, hooks 21 and/or 22 may have a distinct orientation/bias. In other words, one of skill understands that a single hook has a single direction by which the hooking can be effected. Therefore, it becomes possible to arrange a row of hooks 21 having a single orientation within the row as shown at FIG. 4. According to some embodiments of the present disclosure, rows having a single orientation may be exclusively placed on gripping face 6, thus providing a plurality of orientations for fastener 1, based on an installation position with substrate 3.

Alternatively, according to some embodiments, orientation of hooks 21 and/or 22 may be alternated throughout a row of hooks 21 and 22, so as to present an alternating orientation. Such a configuration thus provides a reduced number of distinct orientations for fastener 1 within substrate 3, but with greater flexibility for a material to be fastened (e.g., greater chance of a fastening loop being caught on a hook).

Anchoring portion 15 may be generally cylindrical in shape and may be provided with a tapered portion at the anchor distal end 17, for example, to facilitate insertion into a through-hole present in substrate 3, among others. A taper angle of the tapered portion may range from between about 60 degrees to 85 degrees relative to gripping portion 5, particularly around 75 degrees. Importantly, while the term cylindrical is used to describe a shape of anchoring portion 15 in an exemplary embodiment, it is to be understood that a shape of anchoring portion 15 could also be implemented generally as a three-dimensional polygon, e.g., a rectangular cylinder, an elliptical cylinder, etc. In addition, the term "generally" is intended to indicate the shape of anchoring portion absent additional features described below, e.g., resilient clip 20 and/or rotational locking means 24.

The anchoring portion 15 includes at least one resilient clip 20 (e.g., one clip, two clips, three clips, etc.) configured to anchor the fastening element 1 in substrate 3 with a retention force greater than an insertion force necessary for inserting the anchoring portion 15 into a mounted position on substrate 3. Resilient clips may be spaced around a circumference of a cylindrical anchoring portion 15 based on, for example, the number of resilient clips 20 present. For example, where 2 resilient clips are present on a cylindrical anchoring portion 15, resilient clips 20 may be spaced 180 degrees on center from one another.

In another example, where a polygonal cylinder has been implemented as anchoring portion 15, each face of the polygonal cylinder may include a resilient clip 20, or alternatively, alternating faces of the polygonal cylinder may present a resilient clip 20. One of skill will recognize that any such configuration falls within the scope of the present disclosure.

According to some embodiments, resilient clip 20 may include a clip proximal end 29 located in proximity to the anchor distal end 17 and a clip distal end 28 located in proximity to the anchor proximal end 16. For example, clip proximal end 29 may be positioned at or near a termination of the taper of anchor distal end as measured along the longitudinal axis Y.

One of skill in the art will understand that a width and length of resilient clip 20 may be tuned in order to modify an insertion force used for installation of fastening element 1 into a substrate 3. According to some embodiments, a length H2 of resilient clip 20 (i.e., from back face 6 to clip proximal end 29) may range from about 40 percent to 70 percent of the overall thickness T of fastening element 1 (e.g., 3.5 mm to 5.5 mm in some embodiments), and in some embodiments, may be between about 4.5 mm and 5.5 mm.

According to the embodiment described above, a width W of resilient clip 20 having the above-described proportions may range, for example, between about 20 and 40 percent of the length H2 of resilient clip, e.g., between about 0.9 mm and 2.6 mm. One of skill will understand that insertion force may also be tuned depending on the type of material used for fabrication of fastening element 1, among others, and that the above described measurements are exemplary only.

In addition, a clearance C between clip distal end 28 and back face 7 may ranges between about 2 to 5 percent of the length H2 of resilient clip 20, e.g., between about 0.5 and 2 mm, and in particular, between 1 mm and 2 mm.

Each resilient clip 20 comprises a compression portion 30, a shoulder 35, and a retaining portion 37, among others.

Compression portion 30 may extend from the clip proximal end 29 and be configured to cause a deflection of the at least one resilient clip 20 toward a radial axis Y of the anchoring portion 15 during insertion of the anchoring portion 15 into a receiver of the substrate 3. For example, compression portion 30 may present an acute angle θ relative to the radial axis Y of anchoring portion 15 ranging between about 20 and 70 degrees, such that, upon insertion into a hole in substrate 3, compression portion causes resilient clip 20 to be deflected inward toward radial axis Y of anchoring portion 15. According to some embodiments, the angle θ may correspond to the angle associated with a taper applied to anchoring portion distal end 17.

As one of skill can understand based on the acute angle θ, the deflection of resilient clip 20 becomes greater as compression portion 30 advances further into the hole, until shoulder 35 is reached.

Shoulder portion 35 may extend from a terminus of the compression portion 30 toward the radial axis Y of the anchoring portion 15. For example, the shoulder portion may extend substantially perpendicularly to the radial axis Y of the anchoring portion 15. According to some embodiments, shoulder portion 35 may extend over 5 to 20 percent of the length H2 of resilient clip 20, for example, between about 0.5 and 2 mm, and in particular between about 1 mm and 2 mm.

A shoulder buffer portion 38 may be present and may extend substantially perpendicularly from a terminating portion of the shoulder toward the clip distal end. Shoulder buffer portion 38 may range from about 5 to 20 percent of the overall length of resilient clip 20, for example, between about 0.4 to 1.5 mm.

Retaining portion 37 is configured to exert a retaining force on the substrate 3 based on the resilient action of the at least one clip 20. In other words, a biasing force is produced as a result of the resilient nature of resilient clip 20. This force aids in retaining anchoring portion within substrate 3. In other words, the at least one clip is dimensioned such that a part of the at least one clip extends inside/into the through-hole of the substrate 3, when the fastening element 1 is installed in the through-hole of substrate 3. The part of the clip extending inside the through-hole of substrate 3 exerts a force on the substrate such that the fastener is maintained in position and can resist vibrations without producing sound caused by such vibrations. The retaining portion 37 of resilient clip 20 extends at a non-orthogonal angle α from a position near the shoulder toward the clip distal end as measured relative to the radial axis Y of the anchoring portion 15. For example, the non-orthogonal angle may range between about 10 degrees and 80 degrees, in particular between 20 degrees and 60 degrees. Thus, when an extraction force is applied, force at the retaining portion increases as an extraction distance increases. This results in a suitably high retaining force.

Based on the presence of retaining portion 37, shoulder 35 may be prevented from bearing on substrate 3 except in cases where an extraction force overcoming the retaining force of retaining portion 37 is applied to fastening element 1. In such a case, shoulder 35 may prevent complete extraction of anchoring portion 15 from substrate 3.

Figure 2:
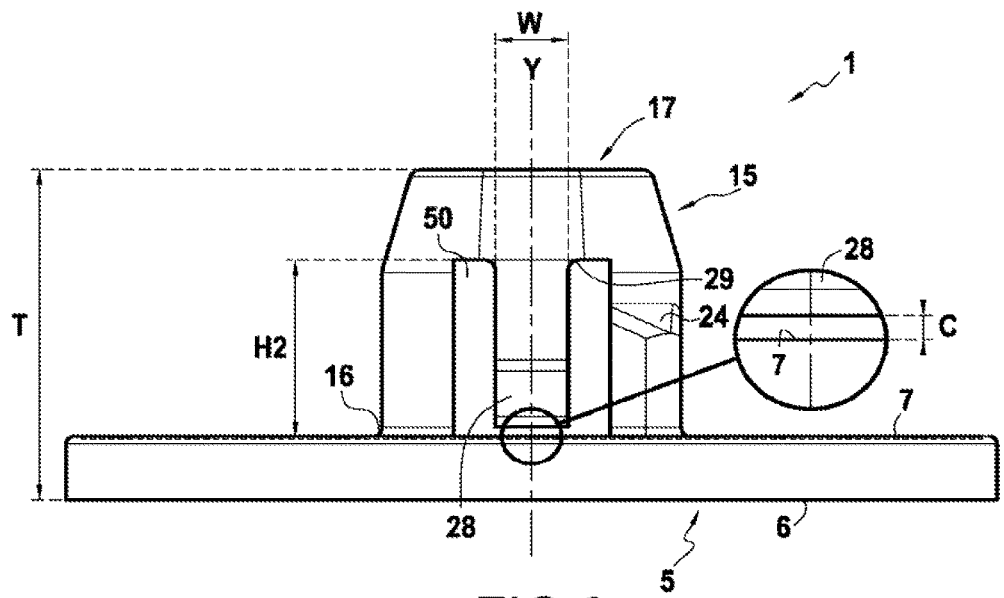
FIG. 2 is an elevation view of a fastening element according to embodiments of the present disclosure.

As show at FIGS. 1A, 1B and 2, the fastener comprises rotational locking means 24. Rotational locking means 24 may be configured such that upon turning (rotating) of fastening element 1 within a through-hole of the substrate, rotational locking means 24 may prevent fastening element 1 from turning further than a predetermined point, and may further prevent turning fastening element 1 back to an insertion position. Rotational locking means 24 may also perform a similar function to that of resilient clips 20, i.e., once fastening element 1 is turned to a position of locking, rotational locking means 24 may further prevent extraction of fastening element 1 from substrate 3.

For example, through-holes in substrate 3 can have different forms, circular, square, rectangular, triangular, etc. According to some embodiments, fastening element 1 may have rotational locking means 24 to lock the rotation of the fastener when the fastening element 1 is installed in the through-hole of the substrate 3.

Rotational locking means 24 may comprise, for example, a ramp and abutment configuration, wherein the ramp may exert an increasing force on a portion of substrate 3 as fastening element 1 is rotated, and the abutment may prevent further turning. Based on the increasing force exerted by the ramp, locking means 24 may then also substantially prevent turning of fastening element 1 back toward an insertion position.

Figure 3A:
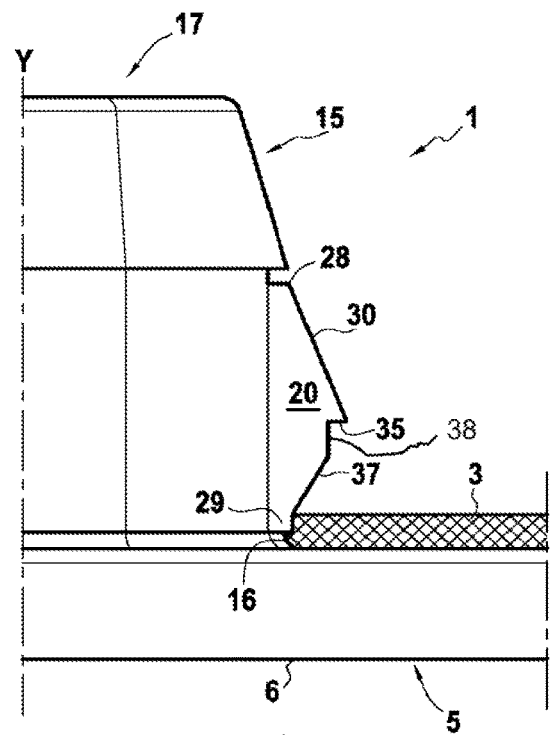
FIG. 3A is an exemplary side view representation of a fastening element according to a second embodiment of the present disclosure, the substrate is a view in cross section which the cut line passing through the middle of the fastening element and the two resilient clips.
Figure 3B:
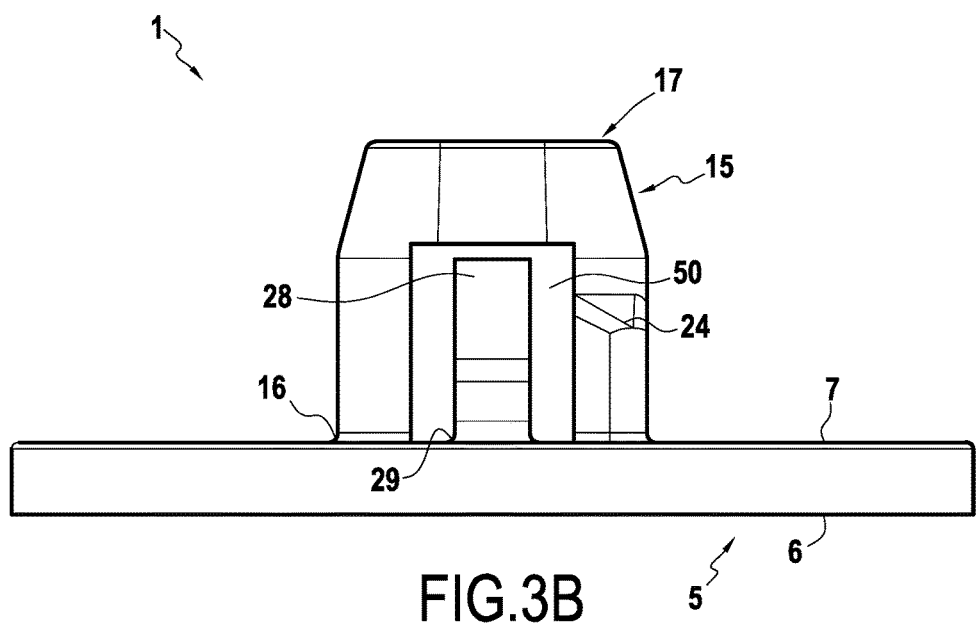
FIG. 3B is an elevation side view of a fastening element of FIG. 3A.
Figure 5:
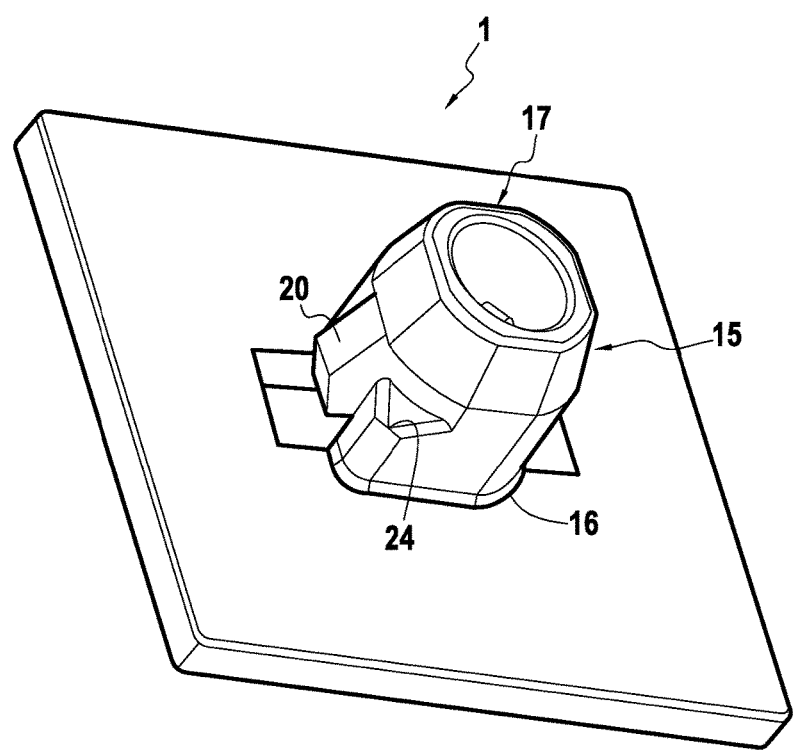
FIG. 5 is a perspective view of the exemplary fastening element represented at FIGS. 1A, 1B, and 2.

As show at FIGS. 2, 3B and 5, the anchoring portion of the fastening element is hollow of material in the middle such that it defines a cavity 50.

On the FIGS. 1A, 2B, 2, 3A, 3B and 5 the plurality of gripping elements are not shown.

According to another embodiment, and as shown at FIGS. 3A and 3B, clip proximal end 29 may be located in proximity to the anchor proximal end 16 and clip distal end 28 may be located in proximity to the anchor distal end 17. In such a case, a clearance between clip distal end 28 and a tip of anchoring portion 15 (i.e., at the distal end of anchoring portion 15) may ranges between about 2 to 5 percent of the length of resilient clip 20, e.g., between about 0.5 and 2 mm, and in particular, between 1 mm and 2 mm.

Although the present disclosure herein has been described with reference to particular embodiments, it is to be understood that these embodiments are merely illustrative of the principles and applications of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances, unless otherwise specified herein.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

The following aspects are intended to set forth various exemplary combinations of features present in the specification, and are not intended as limiting.

Aspect 1. A fastening element, comprising:
a gripping portion having a gripping face and a back face opposite the gripping face;
an anchoring portion comprising an anchor proximal end affixed to the gripping portion and an anchor distal end, the anchoring portion comprising at least one resilient clip configured to anchor the fastening element (1) in a substrate with a retention force greater than an insertion force necessary for inserting the anchoring portion into a mounted position on a substrate, wherein
the at least one resilient clip comprises:
a clip proximal end located in proximity to the anchor distal end and a clip distal end located in proximity to the anchor proximal end;
a compression portion extending from the clip proximal end and configured to cause a deflection of the at least one clip toward a longitudinal axis of the anchoring portion during insertion of the anchoring portion into the substrate;
a shoulder extending from a terminus of the compression portion toward the longitudinal axis of the anchoring portion;
a retaining portion configured to exert a retaining force on the substrate based on the resilient action of the at least one clip, the retaining portion extending at a non-orthogonal angle from a position near the shoulder toward the clip distal end as measured relative to a radial axis of the anchoring portion.

Aspect 2. An multi-substrate anchor for a fastening element, comprising:
an anchor proximal end and an anchor distal end, the anchoring portion comprising at least one resilient clip configured to anchor the fastening element (1) in any one of a plurality of substrates each of the substrates having a thickness that is different from the other substrates, wherein
the at least one resilient clip comprises:
a clip proximal end located in proximity to the anchor distal end and a clip distal end located in proximity to the anchor proximal end;
a compression portion extending from the clip proximal end and configured to cause a deflection of the at least one clip toward a longitudinal axis of the multi-substrate anchor during insertion of the multi-substrate anchor into a through-hole in the substrate;
a shoulder extending from a terminus of the compression portion toward the longitudinal axis of the anchoring portion;
a substrate interface extending from a point near the shoulder and configured to exert a retaining force on at least a portion of the thickness within the through-hole in the substrate based on the resilient action of the at least one clip, the retaining portion extending toward the clip distal end at an acute angle relative to the longitudinal axis of the multi-substrate anchor.

Aspect 3. A fastening element, comprising:
a gripping portion having a gripping face and a back face opposite the gripping face;
an anchoring portion comprising an anchor proximal end affixed to the gripping portion and an anchor distal end, the anchoring portion comprising at least one resilient clip configured to anchor the fastening element in a substrate with a retention force greater than an insertion force necessary for inserting the anchoring portion into a mounted position on a substrate, wherein
the at least one resilient clip comprises:
a clip proximal end located in proximity to the anchor proximal end and a clip distal end;
a compression portion extending at an angle from the clip distal end and configured to cause a deflection of the at least one clip toward a longitudinal axis of the anchoring portion during insertion of the anchoring portion into a receiver of the substrate;
a shoulder extending from a terminus of the compression portion toward the longitudinal axis of the anchoring portion;
a retaining portion configured to exert a retaining force on the substrate based on the resilient action of the at least one clip, the retaining portion extending at a non-orthogonal angle from a position near the shoulder toward the clip proximal end as measured relative to a radial axis of the anchoring portion.

Aspect 4. The fastening element according to any of the preceding Aspects, wherein in an at-rest position of the resilient clip, the shoulder extends perpendicularly to the longitudinal axis of the anchoring portion.

Aspect 5. The fastening element according to any of the preceding Aspects, comprising a shoulder buffer portion extending perpendicularly from the shoulder toward the clip distal end.

Aspect 6. The fastening element according to any of the preceding Aspects, wherein the non-orthogonal angle ranges between 10 and 80 degrees as measured relative to a radial axis of the anchoring portion.

Aspect 7. The fastening element according to any of the preceding Aspects, wherein the insertion force ranges between about 25 and 45 N and the retention force is higher than 133 N, in particular, between about 133 and 250 N.

Aspect 8. The fastening element according to any of previous Aspects, wherein the gripping face comprises at least one of a plurality of hooks and/or a plurality of loops.

Aspect 9. The fastening element according to Aspect 6, wherein the gripping face comprises a plurality of hooks integrally molded with the fastening element.

Aspect 10. The fastening element according to any of Aspects 1-7, wherein a length of the at least one resilient clip ranges between 3.5 and 5.5 mm as measured from a tip of the clip distal end to a base of the clip proximal end, in particular, between 4.5 mm and 5.5 mm.

Aspect 11. The fastening element according to any of Aspects 1-8, wherein the anchoring portion is integrally molded with the gripping portion.

Aspect 12. The fastening element according to any of Aspects 1-8, wherein the anchoring portion is fastened to the back face.

Aspect 13. The fastening element according to Aspect 10, wherein the fastening is performed by at least one of gluing and overmolding.

Aspect 14. The fastening element according to any of Aspects 1, 2, and 4-12, wherein a clearance between the clip distal end and the back face ranges between 0.5 and 2 mm, in particular, between 1 mm and 2 mm.

Aspect 15. The fastening element of any of the preceding Aspects, wherein a width of the at least one clip ranges between 0.9 and 2.6 mm.

Aspect 16. The fastening element of any of the preceding Aspects, wherein the fastening element and anchoring portion are molded of a thermoplastic material.

Aspect 17. The fastening element according to any of preceding aspects, wherein the shoulder has a width ranging from 0.4 to 1.5 mm.

It is intended that the specification and examples be considered as exemplary only, with a true scope of the disclosure being indicated by the following claims.

What is claimed is:

1. A fastening element, comprising:
    a gripping portion having a gripping face and a back face opposite the gripping face, wherein the gripping face comprises at least one of a plurality of hooks and/or a plurality of loops; and
    an anchoring portion comprising an anchor proximal end affixed to the gripping portion and an anchor distal end, the anchoring portion comprising at least one resilient clip configured to anchor the fastening element in a substrate with a retention force greater than an insertion force necessary for inserting the anchoring portion into a mounted position on a substrate, wherein
    the at least one resilient clip comprises:
        a clip proximal end located in proximity to the anchor distal end and a clip distal end located in proximity to the anchor proximal end;
        a compression portion extending from the clip proximal end and configured to cause a deflection of the at least one clip toward a longitudinal axis of the anchoring portion during insertion of the anchoring portion into a receiver of the substrate;
        a shoulder extending from a terminus of the compression portion toward the longitudinal axis of the anchoring portion and parallel to a radial axis of the anchoring portion, wherein the radial axis is orthogonal to the longitudinal axis; and
        a retaining portion configured to exert a retaining force on the substrate based on the resilient action of the at least one clip, the retaining portion extending at a non-orthogonal angle toward the clip distal end as measured relative to the radial axis of the anchoring portion.

2. The fastening element according to claim 1, wherein in an at-rest position of the resilient clip, the shoulder extends substantially perpendicularly to the longitudinal axis of the anchoring portion.

3. The fastening element according to claim 1, comprising a shoulder buffer portion extending substantially perpendicularly from the shoulder toward the clip distal end.

4. The fastening element according to claim 1, wherein the non-orthogonal angle ranges between 10 and 80 degrees as measured relative to a radial axis of the anchoring portion.

5. The fastening element according to claim 1, wherein the insertion force ranges between about 25 and 45 N and the retention force is higher than 133 N.

6. The fastening element according to claim 1, wherein the gripping face comprises a plurality of hooks integrally molded with the fastening element.

7. The fastening element according to claim 1, wherein a length of the at least one resilient clip ranges between 3.5 and 5.5 mm as measured from a tip of the clip distal end to a base of the clip proximal end.

8. The fastening element according to claim 1, wherein the anchoring portion is integrally molded with the gripping portion.

9. The fastening element according to claim 1, wherein the anchoring portion is fastened to the back face.

10. The fastening element according to claim 9, wherein the fastening is performed by at least one of gluing and overmolding.

11. The fastening element according to claim 1, wherein a clearance between the clip distal end and the back face ranges between 0.5 and 2 mm.

12. The fastening element according to claim 1, wherein a width of the at least one clip ranges between 0.9 and 2.6 mm.

13. The fastening element according to claim 1, wherein the fastening element and anchoring portion are molded of a thermoplastic material.

14. The fastening element according to claim 1, wherein the shoulder has a width ranging from 0.4 to 1.5 mm.

15. A fastening element, comprising:
    a gripping portion having a gripping face and a back face opposite the gripping face, wherein the dripping face comprises at least one of a plurality of hooks and/or a plurality of loops;
    an anchoring portion comprising an anchor proximal end affixed to the gripping portion and an anchor distal end, the anchoring portion comprising at least one resilient clip configured to anchor the fastening element in a substrate with a retention force greater than an insertion force necessary for inserting the anchoring portion into a mounted position on a substrate, wherein
    the at least one resilient clip comprises:
        a clip proximal end located in proximity to the anchor end and a clip distal end;
        a compression portion extending at an angle from the clip distal end and configured to cause a deflection of the at least one clip toward a longitudinal axis of the anchoring portion during insertion of the anchoring portion into a receiver of the substrate;
        a shoulder extending from a terminus of the compression portion toward the longitudinal axis of the anchoring portion and parallel to a radial axis of the anchoring portion, wherein the radial axis is orthogonal to the longitudinal axis; and a retaining portion configured to exert a retaining force on the substrate based on the resilient action of the at least one clip, the retaining portion extending at a non-orthogonal angle toward the clip proximal end as measured relative to the radial axis of the anchoring portion.

\* \* \* \* \*